Feb. 11, 1958    W. E. SLAVENS ET AL    2,822,811
CORN HUSKING MECHANISM
Filed June 22, 1956    3 Sheets-Sheet 1

INVENTORS
WAYNE E. SLAVENS &
HOWARD C. HADLEY
BY
ATTORNEYS

Feb. 11, 1958

W. E. SLAVENS ET AL 2,822,811

CORN HUSKING MECHANISM

Filed June 22, 1956

INVENTORS
WAYNE E. SLAVENS &
HOWARD C. HADLEY

BY

ATTORNEYS

Feb. 11, 1958

W. E. SLAVENS ET AL 2,822,811

CORN HUSKING MECHANISM

Filed June 22, 1956

INVENTORS
WAYNE E. SLAVENS &
HOWARD C. HADLEY
BY
ATTORNEYS

United States Patent Office 2,822,811
Patented Feb. 11, 1958

2,822,811

CORN HUSKING MECHANISM

Wayne E. Slavens and Howard C. Hadley, Des Moines, Iowa, assignors to Deere Manufacturing Co., Dubuque, Iowa, a corporation of Iowa Application June 22, 1956, Serial No. 593,197

8 Claims. (Cl. 130—5)

This invention relates to a husking mechanism adapted for use with a corn harvester. More particularly this invention relates to the cleaning mechanism incorporated in the husking unit.

In a conventional type corn picker which includes a forwardly extending picking unit serving to separate the ears of corn from the stalks and deliver them to a husking unit, there is created a considerable amount of trash such as broken stalks, loose husks, and other foreign matter which is also picked up by the gathering or harvesting unit and delivered to the husking units. In fields where there are considerably large yields, the accumulation of excess trash delivered into the husking unit creates a problem of no small degree since provision must be made in the husking unit to eliminate the trash from the corn before it is stored or otherwise treated. Also, in many instances, the trash will accumulate in such large amounts that eventually it will clog the husking unit thereby forcing a stoppage and a delay in the harvesting.

It is the primary object of this invention to provide a husking unit which receives the corn from the harvesting unit, moves the ears to one end of the husking unit as they are being husked, and moves the husks and trash to the opposite end of the husking unit. Featured in the husking unit is a blower or fan means which directs a blast of air over the husking rolls, through the corn gravitating on to the husking rolls, through the husked or treated corn prior to its leaving the husking unit and entering into the discharge elevator, all for the purpose of cleaning trash from the corn and to prevent an accumulation of husks and trash in the husk box.

A further object of the invention is to provide a single fan system driven from the husk driving mechanism which provides the air blast for the above purpose.

Other objects and advantages will become apparent to those skilled in the art as the nature of the invention is better understood from the following detailed description illustrated in the accompanying drawings.

Figure 1:
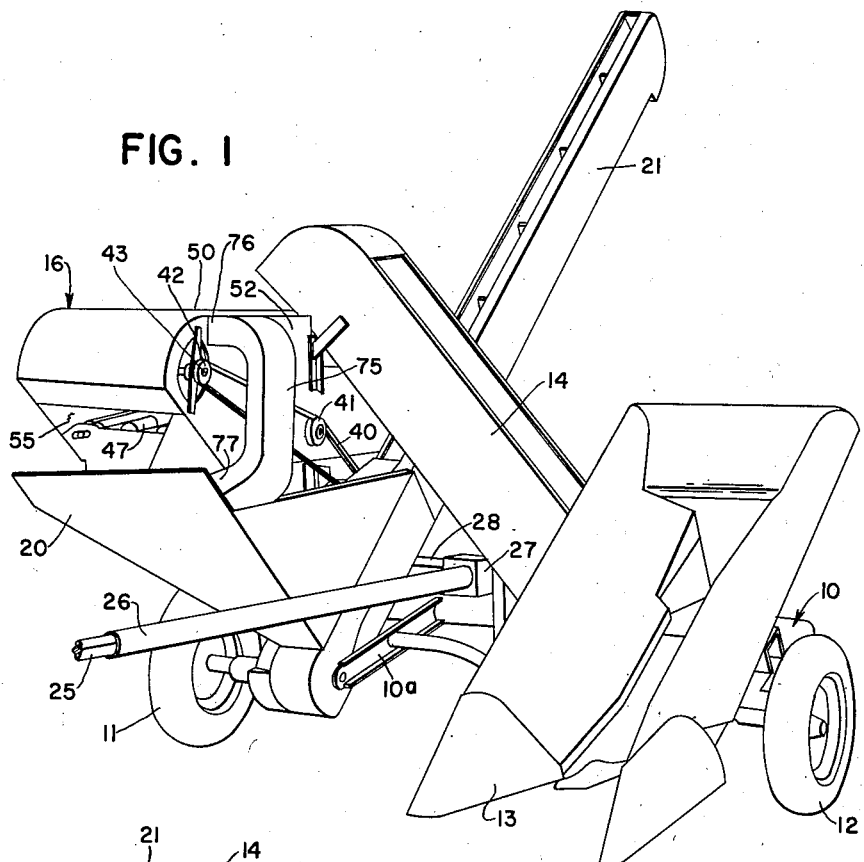
Fig. 1 is a front perspective of a corn harvester which incorporates the use of the husking mechanism.
Figure 3:
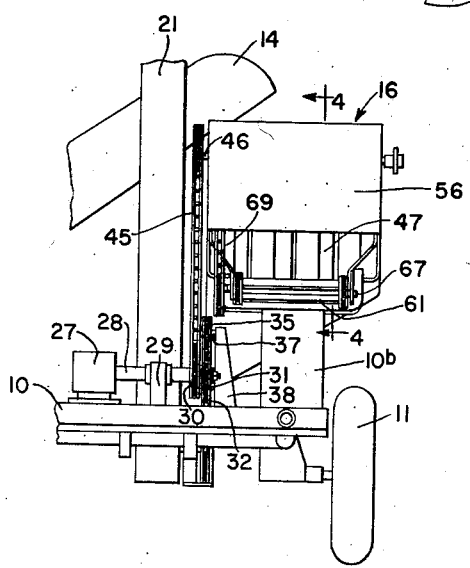
Fig. 3 is a rear view of a portion of the corn harvester.
Figure 2:
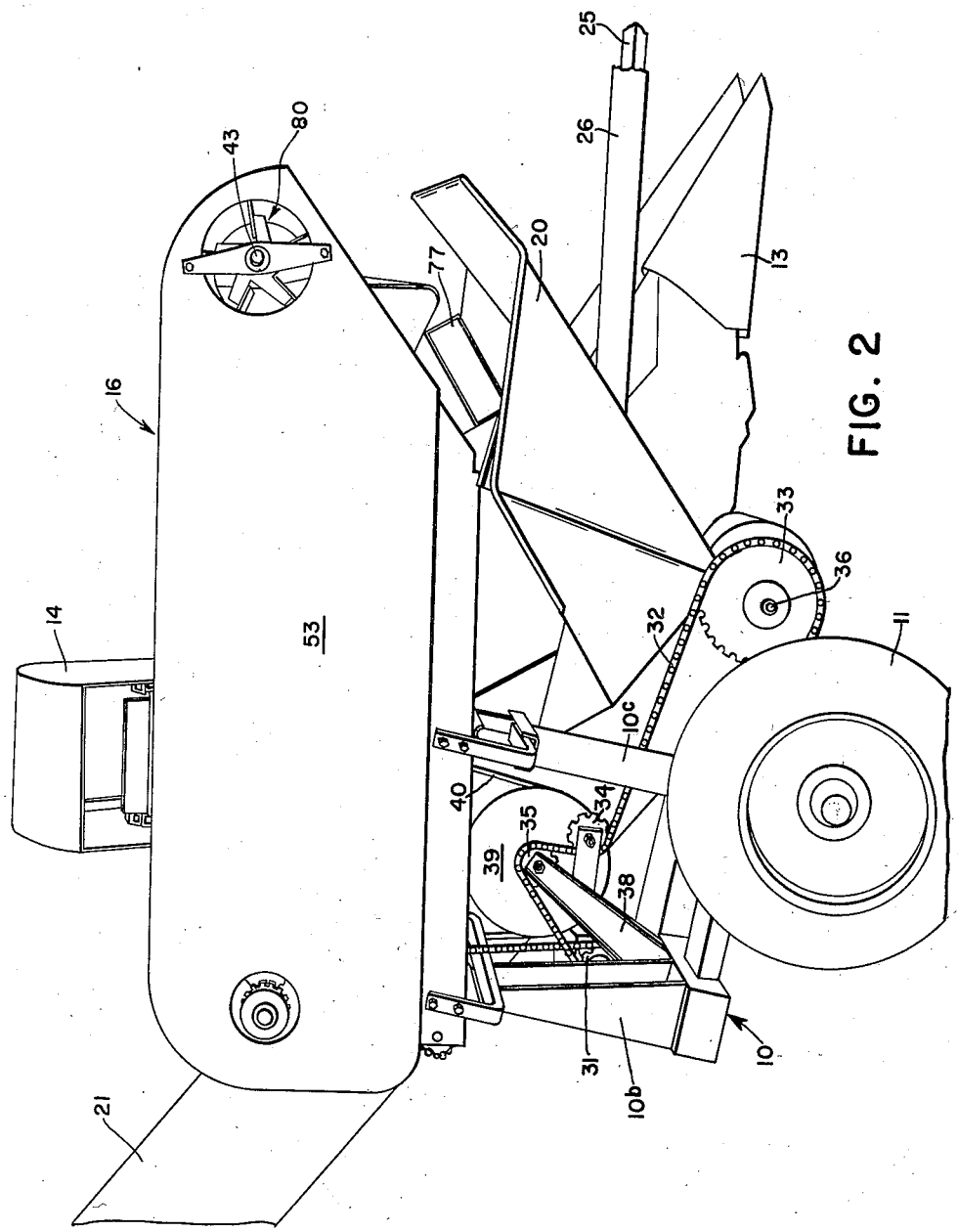
Fig. 2 is a side elevation of the corn harvester.

The present invention is shown in conjunction with a pulled type of corn harvester, although it should be recognized that any type of corn harvester would operate with the husking unit. The husking unit may also operate as a stationary unit as well as being mounted on a harvester.

The corn harvester is composed of a main frame 10 supported on a pair of transversely spaced apart wheel structures 11, 12. Mounted on the left side of the main frame 10 is a gathering and picking unit 13 which extends forwardly from the main frame and is adapted to separate the ears from the stalks as the unit moves over a field of row planted corn. The picking unit 13 is of a conventional style, details of which are of no importance for the present invention. The picking unit 13 delivers the ears of corn in an unhusked condition to a transverse elevator 14 which in turn delivers the corn through an intake opening 15 of a husking unit 16. Provided in the husking unit 16 is means for moving the ears forwardly as they are husked to be discharged at the forward end of the husking unit into an elevator hopper 20 which is positioned at the lower end of a wagon elevator 21. The husking unit 16, hopper 20, and wagon elevator 21 are supported on the main frame 10 by suitable structural framework such as at 10a, 10b, 10c.

Operating mechanism for the harvester unit is supplied normally from the power take-off shaft of a tractor (not shown) which is articulately connected to a power shaft 25 supported for rotation in a forwardly extending tubular member 26. The shaft 25 and tube 26 are terminated at their rear in a gear transmission 27 which is fixed to the main frame 10. A transverse shaft 28 extends from the transmission 27 and is journaled on the frame 10 by means of a support 29. On the right end of the shaft 28 are sprockets 30, 31. A chain drive is driven from the outer sprocket 31 and comprises a chain 32, an elevator drive sprocket 33, an idler sprocket 34 and a drive sprocket 35. The sprocket 33 is mounted on the elevator drive shaft 36 and operates the conveying mechanism in the elevator 21. The sprocket 35 is mounted on and drives a short stub shaft 37, one end of which is journaled in a supporting framework 38 and the other end of which serves as a support for a V-belt pulley 39. The idler sprocket 34 obviously serves to provide take-up in the chain drive. Threaded over the pulley 39 is a V-belt 40, which in addition to the pulley 39 is also mounted over a series of pulleys as at 41, 42 (Fig. 1) to ultimately drive a fan drive shaft 43.

The inner sprocket 30 is a part of a chain drive, indicated in its entirety by the reference numeral 45 which operates to drive a drive shaft 46 in the husking unit 16. Other drive mechanism, such as that required to drive the transverse elevator 14 and the picking unit 13 is not shown, but is of a conventional type and in general operates from the transmission 27. Other features, characteristics, and details of the harvesting unit, other than that which will presently be described as pertaining to the husking unit, are of a general nature, and for purposes of this invention are not required for a full understanding.

Figure 4:
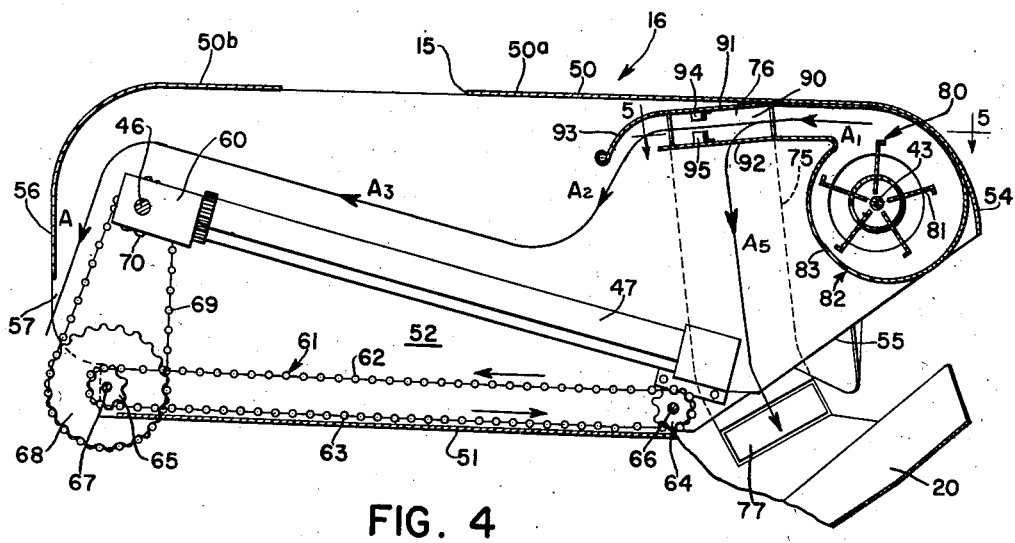
Fig. 4 is a sectional view of the husking unit as taken along the line 4—4 of Fig. 3.

The corn husking mechanism 16 is supported on the frame 10 by means of framework 10b, 10c. The mechanism is comprised of a housing unit supported on the frame which includes upper and lower panels 50, 51, respectively, which are interconnected at their outer edge by depending side panels 52, 53 to form an elongated and fore-and-aft extending box-like structure. The upper panel 50 is composed of two portions 50a, 50b which are spaced apart fore-and-aft to form with the side panels 52, 53 the ear receiving opening 15. A plurality of pairs of husking rolls 47 are supported in the housing and are positioned beneath the ear receiving opening 15 to receive the ears gravitating through the opening. As shown in Fig. 4, the husking rolls are inclined so that the ears of corn will move forwardly in the husking unit.

The forward portion of the upper panel 50a is curved downwardly as at 54 to form with the side panels 52, 53 and the bottom panel 51 a discharge opening 55 at the forward and lower end of the housing unit. Similarly, the rear section 50b at the upper panel 50 is curved downwardly at the rear of the housing as at 56 to form an end panel on the housing. The panel section 56 is terminated short of the lower panel 51 and forms with the side panels 52, 53 and the lower panel 51 a husk or trash discharge opening 57 at the rear or opposite end of the husking unit housing.

The husk rolls 47 are driven by means of a bevel gear transmission arrangement not shown, but indicated generally by the transmission housing 60. The drive shaft 46 operates to drive the bevel gearing within the housing and consequently to rotate the husking rolls 47.

Positioned beneath the husking rolls 47 is a fore-and-aft conveyor 61. The conveyor 61 is of a chain type and extends the width of the housing. The conveyor is comprised of upper and lower runs 62, 63 respectively and is mounted over drive sprockets 64, 65 which are mounted on front and rear transverse sprocket shafts 66, 67. The shafts 66, 67 are suitably supported in the side panels 52, 53 of the housing. The rear drive shaft 67 is driven by a relatively large sprocket 68 which in turn is driven by a chain 69 mounted also over a sprocket 70 fixed to the shaft 46. The chain drive, composed of the chain 69 and the sprockets 68, 70 operate to drive the conveyor chain 61 in a direction to cause the upper run 62 to move rearwardly, as indicated by an arrow, toward the discharge opening 57 and the lower run 63 to move forwardly, also indicated by the arrow, toward the crop discharge opening 55.

Mounted on the husking unit housing outwardly of the side panel is a vertically disposed air duct 75 having its upper and lower ends turned inwardly as at 76, 77. The upper or air-intake end 76 opens into the husking unit housing and the lower or air-discharge end 77 opens beneath the crop discharge outlet 55 and adjacent to the forward end of the husk rolls 47 and the conveyor 61.

Figure 5:
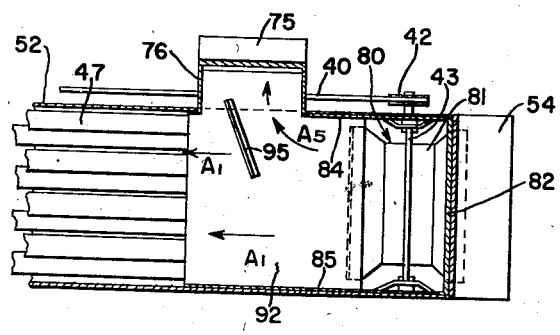
Fig. 5 is a sectional view taken along the line 5—5 of Fig. 4.

Also mounted in the husking unit housing at its upper forward end is a fan 80 comprised of fan blades 81 fixed to the fan drive shaft 43, and a fan housing 82, the upper portion of which is congruent with the upper panels 50, 54 of the husking unit housing and the lower portion of which is curved as at 83 to surround the rotating fan blades 81. As shown in Fig. 5, the fan housing 82 includes side panels 84, 85 adjacent to and fixed to the housing side panels 52, 53. The fan directs a blast of air through a discharge spout 90 composed of vertically spaced apart and parallel sheet metal pieces 91, 92. The upper panel or sheet 91 is curved downwardly as at 93 to create a downward draft of the air blast as it passes into the husking unit housing. Fixed to the underside of the upper sheet 91 is a short angle iron 94 having one leg fixed to the sheet 91 so as to cause the other leg to depend into the opening of the discharge spout 90. Similar to the upper angle iron 94 is a lower angle iron 95 having one leg fixed to the upper surface of the sheet 92 with the other leg extending upwardly into the opening of the discharge spout. The angle irons 94, 95 extend only partially the width of the discharge spout 90 and are spaced apart vertically to permit air passage between them. As clearly indicated in Fig. 5 the angle irons are angled relative to the direction of the air blast issuing from the fan and extend into the upper end 76 of the vertically disposed air duct 75.

In operation, the husking rolls 47 will receive the unhusked ears of corn through the intake opening 15 and will direct them to the forward lower end of the husking rolls. The upper run 62 of the conveyor will receive the husks passing through the husking rolls and convey them rearwardly and through the trash discharge opening 57. The lower run 63 will drive kernels of corn dislodged from the ears in the husking operation and other incidental trash gravitating to the upper surface of the lower housing panel 51 forwardly to be discharged through the corn discharge opening 55. In the husking operation there will be a considerable amount of trash which enters into the husking unit housing and will be dislodged from the ears in the housing. The fan 80 directs a blast of air through the discharge duct 90 in the direction of the arrow $A^1$. The blast will be directed downwardly as at $A^2$ by the curved extension 93 toward the husking rolls 47. The air blast passing through the ears of corn on the husking rolls will tend to clean or dislodge foreign matter and trash from the ears. The husking rolls 47 will redirect the air blast, as at $A^3$, to traverse the incoming stream of unhusked ears passing through the opening 15, again causing a certain amount of trash to continue in the air stream. The panel 56 at the rear of the husking unit will direct the air blast downwardly where the trash collected in the blast as well as the blast itself will be discharged through the trash opening 57. Husks removed from the ears will at the same time be moving rearwardly on the upper run 62 of the conveyor 61 and be discharged in the trash opening 57. The air blast will cause the husks to be scattered as they leave the discharge opening 57 thereby serving to prevent clogging or accumulation of the husks and trash at the mouth of the opening 57.

A portion of the air blast $A^5$ will be directed by the depending leg of the angle iron 94 and the upwardly extending leg of the angle iron 95 into the mouth or intake opening of the air duct 75 where it will pass downwardly to the lower portion of the husking unit to be discharged from the lower outlet end 77. The ears of corn exiting from the lower end of the husking rolls 47 and the incidental kernels from the lower run 63 will gravitate in a stream of commingled corn and incidental trash remaining with the corn. The blast of air leaving the lower end 77 of the air duct 75 will traverse this stream and will cause the trash to be blown outwardly of the stream, thereby cleaning the corn prior to its entering the elevator hopper 20.

While only one form of the invention has been shown it should be recognized that other forms and variations could exist without departing basically from the broad general principles herein claimed. It should, therefore, be understood that while the preferred form of the invention has been described with the view of clearly and concisely illustrating its principles it is desired not to so limit or narrow the invention beyond that which is claimed.

What is claimed is:

1. A corn husking mechanism comprising a supporting frame, a housing unit on the frame including upper and lower panels interconnected by laterally spaced side panels and having an upper intake opening for receiving unhusked ears of corn, a trash discharge opening at one end thereof, and a lower corn discharge opening at the opposite end thereof; husking rolls mounted on the frame under the intake opening to receive and direct ears of corn and incidental trash accumulated with the ears to the corn discharge opening; a conveyor mounted under the husking rolls having upper and lower runs, the upper run being adapted to collect and transfer husks passing through the husking rolls to the trash discharge opening, and the lower run being adapted to move over the lower panel for moving kernels of corn and other incidental trash collected thereon to the corn discharge opening; a fan mounted on the frame at said opposite end of the housing unit directing a blast of air over the husking rolls and passing through the corn moving through the intake opening; panel means at said one end for redirecting the blast downwardly and through the trash discharge opening for scattering husks passing through the latter opening; a vertically disposed air duct outward of one of the side panels having an air intake end opening into the housing unit and an air discharge end opening proximate to the corn discharge opening; and means directing a portion of the air blast through the air duct for causing said portion of the blast to traverse the commingled corn and trash passing through the corn discharge opening to drive the trash therefrom.

2. A corn husking mechanism comprising a supporting frame, a housing unit on the frame including upper and lower panels interconnected by laterally spaced side panels and having an upper intake opening for receiving unhusked ears of corn, a trash discharge opening at one end thereof, and a corn discharge opening at the opposite end thereof; husking rolls mounted on the frame under the intake opening to receive and direct ears of corn and incidental trash accumulated with the ears to the corn discharge opening; conveyor means under the husking rolls adapted to collect and transfer husks passing through the husking rolls to the trash discharge opening and to collect and transfer kernels of corn and other incidental trash to the corn discharge opening; a fan mounted on the frame at said opposite end of the housing unit directing a blast of air over the husking rolls and passing through the corn moving through the intake opening; panel means at said one end for redirecting the blast through the trash discharge opening for scattering husks passing through the latter opening; a vertically disposed air duct outward of one of the side panels having an air intake end opening into the housing unit and an air discharge end opening proximate to the corn discharge opening; and means directing a portion of the air blast through the air duct for causing said portion of the blast to traverse the commingled corn and incidental trash passing through the corn discharge opening to drive the trash therefrom.

3. A corn husking mechanism comprising a supporting frame, a housing unit on the frame including upper and lower panels interconnected by laterally spaced side panels and having an upper intake opening for receiving unhusked ears of corn, a trash discharge opening at one end thereof, and a corn discharge opening at the opposite end thereof; husking rolls mounted on the frame under the intake opening to receive and direct ears of corn and incidental trash accumulated with the ears to the corn discharge opening; conveyor means under the husking rolls adapted to collect and transfer husks passing through the husking rolls to the trash discharge opening and to collect and transfer kernels of corn and other incidental trash to the corn discharge opening; a fan mounted on the frame directing a blast of air over the husking rolls and passing through the corn moving through the intake opening; panel means at said one end for redirecting the blast through the trash discharge opening for scattering husks passing through the latter opening; and means redirecting a portion of the air blast to traverse the commingled corn and incidental trash passing through the corn discharge opening to drive the trash therefrom.

4. A corn husking mechanism comprising a supporting frame, a housing unit on the frame including upper and lower panels interconnected by laterally spaced side panels and having an upper intake opening for receiving unhusked ears of corn, a trash discharge opening at one end thereof, and a corn discharge opening at the opposite end thereof; husking rolls mounted on the frame under the intake opening to receive and direct ears of corn and incidental trash accumulated with the ears to the corn discharge opening; conveyor means under the husking rolls adapted to collect and transfer husks passing through the husking rolls to the trash discharge opening; a fan mounted on the frame directing a blast of air over the husking rolls and passing through the corn moving through the intake opening; panel means at said one end for redirecting the blast through the trash discharge opening for scattering husks passing through the latter opening; and means redirecting a portion of the air blast to traverse the commingled corn and incidental trash passing through the corn discharge opening to drive the trash therefrom.

5. A corn husking mechanism comprising a supporting frame, a housing unit on the frame including upper and lower panels interconnected by laterally spaced side panels and having an upper intake opening for receiving unhusked ears of corn, a trash discharge opening at one end thereof and a corn discharge opening at the opposite end thereof; husking rolls mounted on the frame under the intake opening to receive and direct ears of corn and incidental trash accumulated with the ears to the corn discharge opening; conveyor means under the husking rolls adapted to collect and transfer husks passing through the husking rolls to the trash discharge opening; a fan mounted on the frame at said opposite end of the housing unit directing a blast of air over the husking rolls and passing through the corn moving through the intake opening and through the trash discharge opening for scattering husks passing through the latter opening; a vertically disposed air duct outward of one of the side panels having an air intake end opening into the housing unit and an air discharge end opening proximate to the corn discharge opening; and means directing a portion of the air blast through the air duct for causing said portion of the blast to traverse the commingled corn and incidental trash passing through the corn discharge opening to drive the trash therefrom.

6. A corn husking mechanism comprising a supporting frame, a housing unit on the frame having an intake opening for receiving unhusked ears of corn, a trash discharge opening and a corn discharge opening; husking rolls mounted on the frame under the intake opening to receive and direct ears of corn and incidental trash accumulated with the ears to the corn discharge opening; conveyor means under the husking rolls adapted to transfer trash passing through the husking rolls to the trash discharge opening; a fan directing a blast of air over the husking rolls, through the corn moving through the intake opening, and through the trash discharge opening for scattering husks passing through the latter opening; an air duct outward of the housing unit having an air intake end opening into the housing unit and an air discharge end opening proximate to the corn discharge opening; and means directing a portion of the air blast through the air duct for causing said portion of the blast to traverse the corn and incidental trash passing through the corn discharge opening to drive the trash therefrom.

7. A corn husking mechanism comprising a supporting frame, a housing unit on the frame having an intake opening for receiving a mixture of trash and unhusked ears of corn, a trash discharge opening and a corn discharge opening; husking rolls mounted on the frame under the intake opening to receive and direct ears of corn and incidental trash to the corn discharge opening; conveyor means under the husking rolls adapted to transfer trash and husks passing through the husking rolls to the trash discharge opening; a fan directing a blast of air through the unhusked ears and through the trash discharge opening; an air duct outward of the housing unit having an air intake end opening into the housing unit and an air discharge end opening proximate to the corn discharge opening; and means directing a portion of the air blast through the air duct for causing said portion of the blast to traverse the corn and incidental trash passing through the corn discharge opening to drive the trash therefrom.

8. A corn husking mechanism comprising a supporting frame, a housing unit on the frame having an intake opening for receiving a mixture of trash and unhusked ears of corn, a trash discharge opening, and a corn discharge opening; husking rolls mounted on the frame under the intake opening to receive and direct ears of corn and incidental trash to the corn discharge opening; conveyor means under the husking rolls adapted to transfer trash and husks passing through the husking rolls to the trash discharge opening; a fan directing a blast of air through the unhusked ears and through the trash discharge opening; and means redirecting a portion of the air blast for causing said portion of the blast to pass through the corn and incidental trash passing through the corn discharge opening to drive the trash therefrom.

References Cited in the file of this patent

UNITED STATES PATENTS

| | | |
|---|---|---|
| 2,298,198 | Coultas et al. | Oct. 6, 1942 |
| 2,340,084 | Scranton | Jan. 25, 1944 |
| 2,443,039 | Johnson | June 8, 1948 |
| 2,492,897 | Siefken | Dec. 27, 1949 |
| 2,687,132 | Andrews | Aug. 24, 1954 |